United States Patent
Chang (10) Patent No.: US 7,178,491 B2
(45) Date of Patent: Feb. 20, 2007

(54) CONTROL SYSTEM AND METHOD FOR ENGINE VALVE ACTUATOR

(75) Inventor: David Y. Chang, Savoy, IL (US)

(73) Assignee: Caterpillar Inc, Peoria, IL (US)

( * ) Notice: Subject to any disclaimer, the term of this patent is extended or adjusted under 35 U.S.C. 154(b) by 330 days.

(21) Appl. No.: 10/454,616

(22) Filed: Jun. 5, 2003

(65) Prior Publication Data

US 2004/0244742 A1 Dec. 9, 2004

(51) Int. Cl.
*F01L 9/02* (2006.01)

(52) U.S. Cl. .............. 123/90.13; 123/90.15; 123/90.16; 123/90.12; 123/320

(58) Field of Classification Search .......... 123/90.12, 123/90.11, 90.13, 90.14, 90.15, 90.16, 90.17, 123/90.48–90.59, 90.33, 90.34, 320, 321, 123/322; 91/365, 374, 378, 52, 469
See application file for complete search history.

(56) References Cited

U.S. PATENT DOCUMENTS

| 3,250,068 A | 5/1966 | Vulliamy |
| 4,424,790 A | 1/1984 | Curtil |

(Continued)

FOREIGN PATENT DOCUMENTS

| JP | 05106415 A2 | 4/1993 |
| JP | 200120457 A | 4/2000 |
| JP | 200145484 A | 5/2000 |
| WO | WO 98/02653 | 1/1998 |

OTHER PUBLICATIONS

Edwards et al., "The Potential of a Combined Miller Cycle and Internal EGR Engine for Future Heavy Duty Truck Applications," The Engineering Society for Advancing Mobility Land Sea Air and Space International, International Congress and Exposition, Feb. 23–26, 1998, pp. 1–19.

Obert, "Internal Combustion Engines and Air Pollution," Based on Internal Combustion Engines, Third Edition, 1973, pp. 612–614.

Challen et al., "Diesel Engine Reference Book, Section Edition," SAE International, 1999, pp. 75, 81, 84, 146, and 263–305.

Yorihiro Fukuzawa et al., "Development of High Efficiency Miller Cycle Gas Engine", Mitsubishi Heavy Industries, Ltd., Technical Review, vol. 38, No. 3, Oct. 2001, pp. 146–150.

(Continued)

*Primary Examiner*—Thomas Denion
*Assistant Examiner*—Zelalem Eshete
(74) *Attorney, Agent, or Firm*—Finnegan, Henderson, Farabow, Garrett & Dunner (57) ABSTRACT

A system and method for controlling a variable valve actuation system for an engine is provided. An engine valve is moved between a first position where the engine valve blocks a flow of fluid and a second position where the engine valve allows a flow of fluid. Fluid is provided to a chamber of a valve actuator adapted to operatively engage the engine valve. A parameter indicative of a viscosity of the fluid provided to the chamber of the valve actuator is sensed. Fluid is trapped within the chamber of the valve actuator to prevent the engine valve from moving to the first position. A response time of the valve actuator is determined based on the viscosity of the fluid provided to the chamber of the valve actuator. The response time indicates the time required to release the fluid from the chamber of the valve actuator to allow the engine valve to move to the first position.

27 Claims, 4 Drawing Sheets

U.S. PATENT DOCUMENTS

| | | | |
|---|---|---|---|
| 4,561,253 A | 12/1985 | Curtil | |
| 4,815,423 A | 3/1989 | Holmer | |
| 5,191,867 A | 3/1993 | Glassey | |
| 5,357,912 A | 10/1994 | Barnes et al. | |
| 5,392,749 A | 2/1995 | Stockner et al. | |
| 5,395,519 A | 3/1995 | Miller | |
| 5,408,979 A | 4/1995 | Backlund et al. | |
| 5,423,302 A | 6/1995 | Glassey | |
| 5,445,128 A | 8/1995 | Letang et al. | |
| 5,449,612 A | 9/1995 | Haughney et al. | |
| 5,682,854 A | 11/1997 | Ozawa | |
| 5,865,158 A | 2/1999 | Cleveland et al. | |
| 5,927,075 A | 7/1999 | Khair | |
| 5,954,033 A | 9/1999 | Moncelle | |
| 6,026,786 A | 2/2000 | Groff et al. | |
| 6,082,328 A | 7/2000 | Meistrick et al. | |
| 6,092,495 A | 7/2000 | Hackett | |
| 6,170,441 B1 | 1/2001 | Haldeman et al. | |
| 6,209,516 B1 | 4/2001 | Yamashita | |
| 6,216,528 B1 | 4/2001 | Carrell et al. | |
| 6,237,551 B1 | 5/2001 | Macor et al. | |
| 6,267,107 B1 | 7/2001 | Ward | |
| 6,273,076 B1 | 8/2001 | Beck et al. | |
| 6,279,550 B1 | 8/2001 | Bryant | |
| 6,301,887 B1 | 10/2001 | Gorel et al. | |
| 6,301,889 B1 | 10/2001 | Gladden et al. | |
| 6,302,076 B1 | 10/2001 | Bredy | |
| 6,360,717 B1 | 3/2002 | Chang et al. | |
| 6,369,539 B1 * | 4/2002 | Morimoto et al. | 318/369 |
| 6,446,589 B1 * | 9/2002 | Nguyen | 123/90.16 |
| 6,467,452 B1 | 10/2002 | Duffy et al. | |
| 6,508,107 B2 | 1/2003 | Carrell et al. | |
| 6,571,765 B2 | 6/2003 | Kuboshima et al. | |
| 6,584,943 B1 * | 7/2003 | Klotz | 123/90.16 |
| 6,651,618 B1 | 11/2003 | Coleman et al. | |
| 6,688,280 B2 | 2/2004 | Weber et al. | |
| 2001/0023671 A1 * | 9/2001 | Vorih | 123/90.12 |

OTHER PUBLICATIONS

Request for *Inter Partes* Reexamination Transmittal Form for U.S. Appl. No. 6,688,280, and Attachment to Request for Inter Parties Reexamination Transmittal Form, Sep. 17, 2004.

Request for *Inter Partes* Reexamination Transmittal Form for U.S. Appl. No. 6,651,618, and Attachment to Request for Inter Parties Reexamination Transmittal Form, Aug. 27, 2004.

http://www.mazda.com.au/corpora/209.html, Oct. 16, 2001, p. 1–6.

* cited by examiner

CONTROL SYSTEM AND METHOD FOR ENGINE VALVE ACTUATOR

TECHNICAL FIELD

The present invention is directed to a system and method for controlling an engine and, more particularly, to a control system and method for an engine valve actuator.

BACKGROUND

The operation of an internal combustion engine, such as, for example, a diesel, gasoline, or natural gas engine, may cause the generation of undesirable emissions. These emissions, which may include particulates and oxides of nitrogen (NOx), are generated when fuel is combusted in a combustion chamber of the engine. An exhaust stroke of an engine piston forces exhaust gas, which may include these emissions, from the engine. If no emission reduction measures are in place, these undesirable emissions will eventually be exhausted to the environment.

Efforts are being made to decrease the amount of undesirable emissions that are exhausted to the environment during the operation of an engine. It is expected that improved engine design and improved control over engine operation may lead to a reduction in the generation of undesirable emissions. Many different approaches, such as, for example, exhaust gas recirculation, water injection, fuel injection timing, and fuel formulations, have been found to reduce the amount of emissions generated during the operation of an engine. After treatments, such as, for example, traps and catalysts have been found to effectively remove emissions from an exhaust flow. Unfortunately, the implementation of these emission reduction approaches typically results in a decrease in the overall efficiency of the engine.

Additional efforts are being focused on improving engine efficiency to compensate for the efficiency loss due to the emission reduction systems. One such approach to improving engine efficiency involves selectively adjusting the actuation timing of the engine valves. For example, the actuation timing of the intake and exhaust valves may be modified to implement a variation on the typical diesel or Otto cycle known as the Miller cycle. In a "late intake" type Miller cycle, the intake valves of the engine are held open during a portion of the compression stroke of the piston.

An engine may be equipped with a variable valve actuation system that allows the actuation timing of the engine valves to be selectively varied to meet the current operating conditions of the engine. As described in U.S. Pat. No. 6,237,551 to Macor et al., issued on May 29, 2001, a variable valve actuation system may be incorporated with a conventional cam-driven valve actuation system. In a conventional cam-driven valve actuation system, the engine valves are driven by a cam arrangement that is operatively connected to the crankshaft of the engine. The rotation of the crankshaft results in a corresponding rotation of a cam that drives one or more cam followers. The movement of the cam followers results in the actuation of the engine valves. The shape of the cam governs the timing and duration of the valve actuation.

As also described in U.S. Pat. No. 6,237,551 to Macor et al., a variable valve actuator may be disposed between the cam arrangement and the engine valve. In the described system, the variable valve actuator includes a chamber in which fluid may be sealed to establish a hydraulic link between the cam and the engine valve. When the hydraulic link is established, all of the valve motion provided by the shape of the cam is transferred to the engine valve to actuate the engine valve. To vary the actuation timing of the engine valve, a control valve may be opened to allow fluid to flow from the chamber. The release of the fluid breaks the hydraulic link between the cam and the engine valve, and the engine valve is allowed to close, independently of the shape of the cam. In this manner, a variable valve actuator may be used to selectively vary the actuation timing of an engine valve.

To achieve the greatest benefits from selectively implementing variations on valve actuation timing, the variable valve actuation system should precisely control the time at which the engine valves are opened and closed to meet the particular operating conditions of the engine. However, the operation of a variable valve actuation system, such as the system described above, may depend upon the properties of the fluid used to operate the valve actuator. Some fluid properties, such as, for example, the fluid viscosity, may change with the operating conditions of the engine and thereby change the operation of the valve actuator. For example, the valve actuator may have a shorter response time when the operating fluid has a low viscosity and a longer response time when the operating fluid has a higher viscosity. If the variable valve actuation system does not account for these types of changes in fluid properties, the time at which the valve actuator opens or closes the valve may not match the operating conditions of the engine. Accordingly, the operation of the variable valve actuation system may result in marginal gains in engine efficiency.

The system and method of the present disclosure solves one or more of the problems set forth above.

SUMMARY OF THE INVENTION

In one aspect, the present disclosure is directed to a method of controlling a variable valve actuation system for an engine. An engine valve is moved between a first position where the engine valve blocks a flow of fluid and a second position where the engine valve allows a flow of fluid. Fluid is provided to a chamber of a valve actuator adapted to operatively engage the engine valve. A parameter indicative of a viscosity of the fluid provided to the chamber of the valve actuator is sensed. Fluid is trapped within the chamber of the valve actuator to prevent the engine valve from moving to the first position. A response time of the valve actuator is determined based on the viscosity of the fluid provided to the chamber of the valve actuator. The response time indicates the time required to release the fluid from the chamber of the valve actuator to allow the engine valve to move to the first position.

In another aspect, the present invention is directed to a variable valve actuation system for an engine. An engine valve is moveable between a first position where the engine valve prevents a flow of fluid and a second position where the engine valve allows a flow of fluid. A cam assembly is connected to the engine valve to move the engine valve between the first position and the second position. A valve actuator has a chamber adapted to receive a flow of fluid. The valve actuator is operable to prevent the engine valve from returning to the first position. A sensor is operable to sense a parameter indicative of a viscosity of the flow of fluid entering the chamber of the valve actuator. A controller is adapted to determine a response time of the valve actuator based on the viscosity of the fluid in the chamber of the valve actuator. The response time indicates the amount of time required to release the fluid from the chamber of the valve actuator to allow the engine valve to move to the first position.

DETAILED DESCRIPTION

Figure 1:
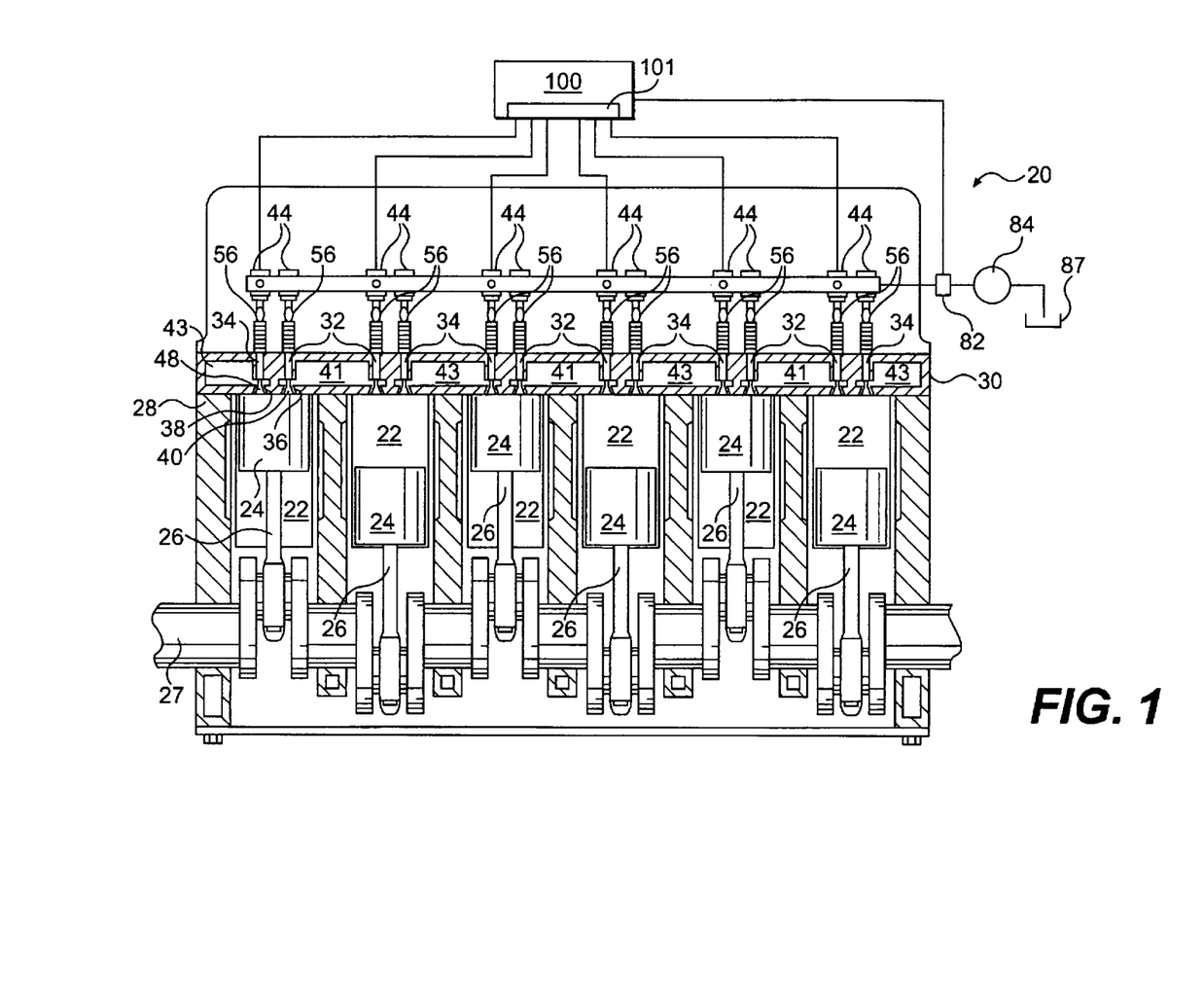
FIG. 1 is a diagrammatic cross-sectional view of an internal combustion engine in accordance with an exemplary embodiment of the present invention.

An exemplary embodiment of an engine 20 is illustrated in FIG. 1. For the purposes of the present disclosure, engine 20 is depicted and described as a four stroke diesel engine. One skilled in the art will recognize, however, that engine 20 may be any other type of internal combustion engine, such as, for example, a gasoline or natural gas engine.

Engine 20 includes an engine block 28 that defines a plurality of cylinders 22. A piston 24 is disposed for sliding movement between a top dead center position and a bottom dead center position within each cylinder 22. In the illustrated embodiment, engine 20 includes six cylinders 22 and six associated pistons 24. One skilled in the art will recognize that engine 20 may include a greater or lesser number of pistons 24 and that pistons 24 may be disposed in an "in-line" configuration, a "V" configuration, or any other conventional configuration.

As also shown in FIG. 1, engine 20 includes a crankshaft 27 that is rotatably disposed within engine block 28. A connecting rod 26 connects each piston 24 to crankshaft 27. Each piston 24 is coupled to crankshaft 27 so that a sliding motion of piston 24 within the respective cylinder 22 results in a rotation of crankshaft 27. Similarly, a rotation of crankshaft 27 will result in a sliding motion of piston 24.

Engine 20 also includes a cylinder head 30. Cylinder head 30 defines an intake passageway 41 that leads to at least one intake port 36 for each cylinder 22. Cylinder head 30 may further define two or more intake ports 36 for each cylinder 22.

An intake valve 32 is disposed within each intake port 36. Intake valve 32 includes a valve element 40 that is configured to selectively block intake port 36. As described in greater detail below, each intake valve 32 may be actuated to lift valve element 40 to thereby open the respective intake port 36. The intake valves 32 for each cylinder 22 may be actuated in unison or independently.

Cylinder head 30 also defines at least one exhaust port 38 for each cylinder 22. Each exhaust port 38 leads from the respective cylinder 22 to an exhaust passageway 43. Cylinder head 30 may further define two or more exhaust ports 38 for each cylinder 22.

An exhaust valve 34 is disposed within each exhaust port 38. Exhaust valve 34 includes a valve element 48 that is configured to selectively block exhaust port 38. As described in greater detail below, each exhaust valve 34 may be actuated to lift valve element 48 to thereby open the respective exhaust port 38. The exhaust valves 34 for each cylinder 22 may be actuated in unison or independently.

Figure 2:
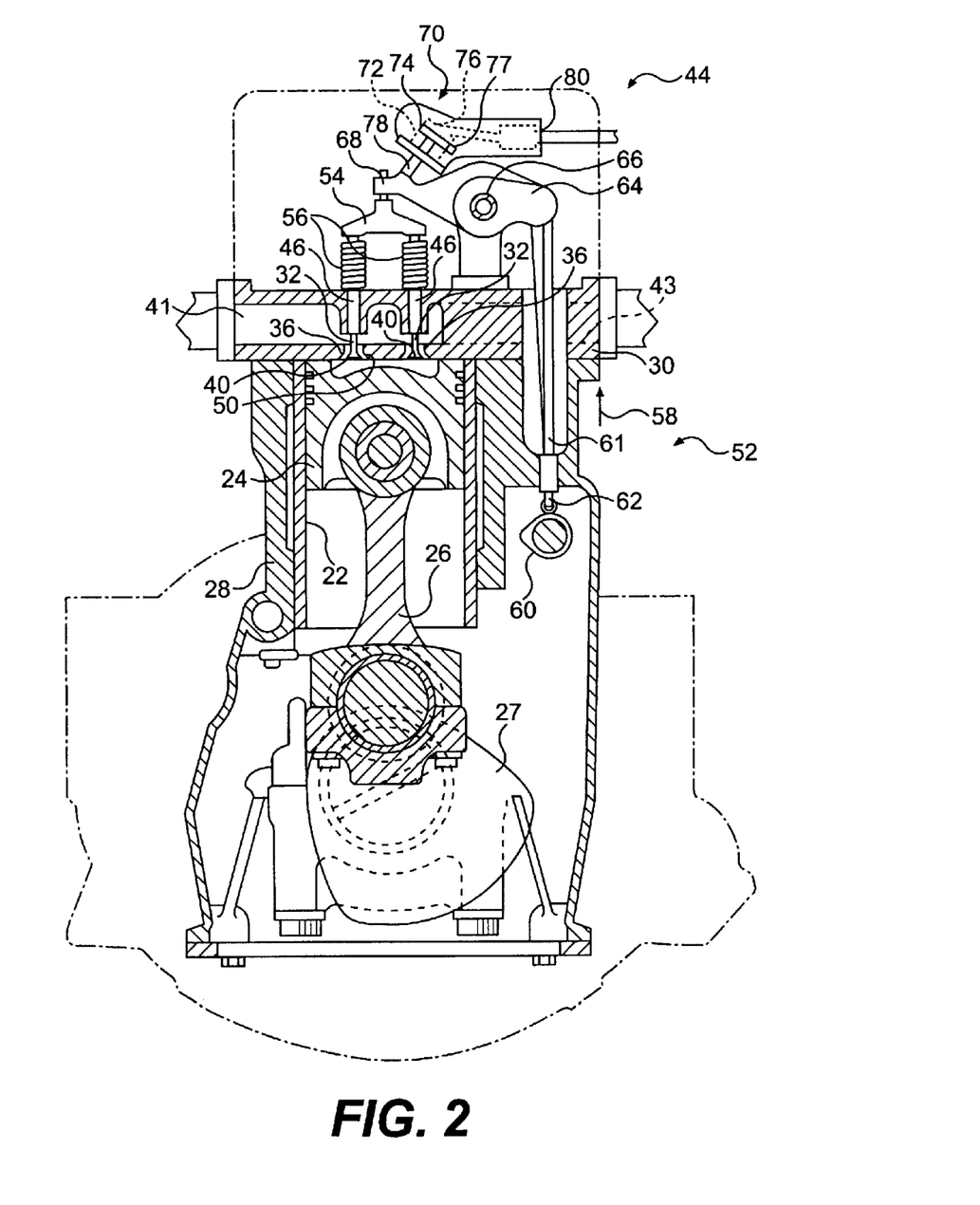
FIG. 2 is a diagrammatic cross-sectional view of a cylinder and valve actuation assembly in accordance with an exemplary embodiment of the present invention.

FIG. 2 illustrates an exemplary embodiment of one cylinder 22 of engine 20. As shown, cylinder head 30 defines a pair of intake ports 36 connecting intake passageway 41 to cylinder 22. Each intake port 36 includes a valve seat 50. One intake valve 32 is disposed within each intake port 36. Valve element 40 of intake valve 32 is configured to engage valve seat 50. When intake valve 32 is in a closed position, valve element 40 engages valve seat 50 to close intake port 36 and block fluid flow relative to cylinder 22. When intake valve 32 is lifted from the closed position, intake valve 32 allows a flow of fluid relative to cylinder 22.

Similarly, cylinder head 30 may define two or more exhaust ports 38 (only one of which is illustrated in FIG. 1) that connect cylinder 22 with exhaust passageway 43. One exhaust valve 34 is disposed within each exhaust port 38. A valve element 48 of each exhaust valve 34 is configured to close exhaust port 38 when exhaust valve 34 is in a closed position and block fluid flow relative to cylinder 22. When exhaust valve 34 is lifted from the closed position, exhaust valve 32 allows a flow of fluid relative to cylinder 22.

As shown in FIG. 1, engine 20 includes a series of valve actuation assemblies 44. One valve actuation assembly 44 may be operatively associated with each pair of intake valves 32 for each cylinder 22. Each valve actuation assembly 44 is operable to move or "lift" the associated intake valve 32 or exhaust valve 34 from a first, or closed, position to a second, or open, position.

In the exemplary embodiment of FIG. 2, valve actuation assembly 44 includes a bridge 54 that is connected to each valve element 40 through a pair of valve stems 46. A spring 56 may be disposed around each valve stem 46 between cylinder head 30 and bridge 54. Spring 56 acts to bias both valve elements 40 into engagement with the respective valve seat 50 to thereby close each intake port 36.

Valve actuation assembly 44 may also include a rocker arm 64. Rocker arm 64 is configured to pivot about a pivot 66. One end 68 of rocker arm 64 is connected to bridge 54. The opposite end of rocker arm 64 is connected to a cam assembly 52. In the exemplary embodiment of FIG. 2, cam assembly 52 includes a cam 60 having a cam lobe and mounted on a cam shaft, a push rod 61, and a cam follower 62. One skilled in the art will recognize that cam assembly 52 may have other configurations, such as, for example, where cam 60 acts directly on rocker arm 64.

Valve actuation assembly 44 may be driven by cam 60. Cam 60 is connected to crankshaft 27 so that a rotation of crankshaft 27 induces a corresponding rotation of cam 60. Cam 60 may be connected to crankshaft 27 through any means readily apparent to one skilled in the art, such as, for example, through a gear reduction assembly (not shown). As one skilled in the art will recognize, a rotation of cam 60 will cause cam follower 62 and associated push rod 61 to periodically reciprocate between an upper and a lower position.

The reciprocating movement of push rod 61 causes rocker arm 64 to pivot about pivot 66. When push rod 61 moves in the direction indicated by arrow 58, rocker arm 64 will pivot and move bridge 54 in the opposite direction. The movement of bridge 54 causes each intake valve 32 to lift and open intake ports 36. As cam 60 continues to rotate, springs 56 will act on bridge 54 to return each intake valve 32 to the closed position.

In this manner, the shape and orientation of cam 60 controls the timing of the actuation of intake valves 32. As one skilled in the art will recognize, cam 60 may be configured to coordinate the actuation of intake valves 32 with the movement of piston 24. For example, intake valves 32 may be actuated to open intake ports 36 when piston 24 is moving from a top-dead-center position to a bottom-dead-center position during an intake stroke to allow air to flow from intake passageway 41 into cylinder 22.

A similar valve actuation assembly 44 may be connected to exhaust valves 34. A second cam (not shown) may be connected to crankshaft 27 to control the actuation timing of exhaust valves 34. Exhaust valves 34 may be actuated to open exhaust ports 38 when piston 24 is moving from a bottom-dead-center position to a top-dead-center position in an exhaust stroke to allow exhaust to flow from cylinder 22 into exhaust passageway 43.

Figure 3:
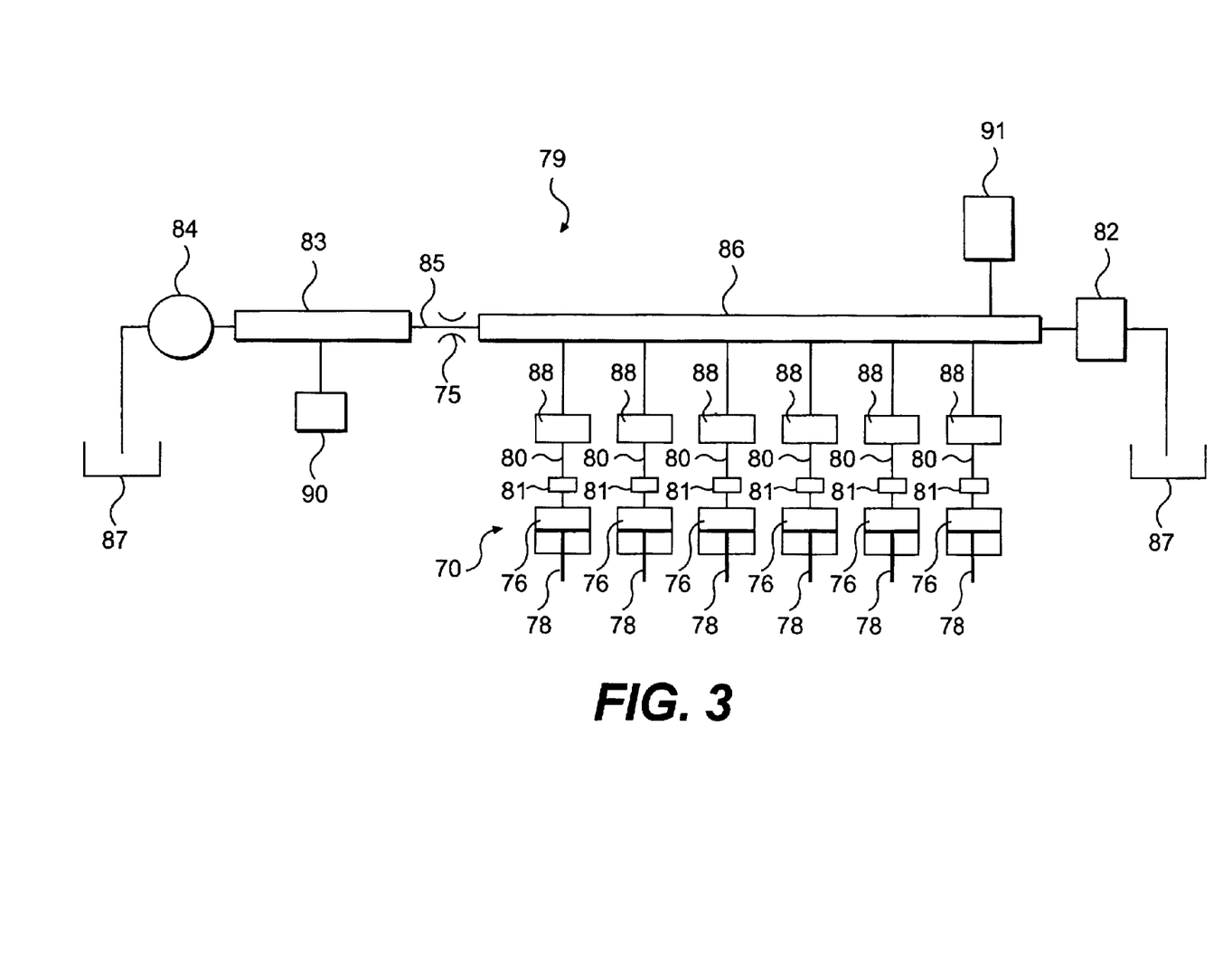
FIG. 3 is a schematic and diagrammatic representation of a fluid supply system for a hydraulic actuator for an engine valve in accordance with an exemplary embodiment of the present invention.

As shown in FIG. 3, a series of valve actuators 70 are provided. In the exemplary embodiment illustrated in the accompanying figures, valve actuators 70 are depicted as "extended motion" actuators, where the valve actuation timing may be extended from the shape of the cam. It is contemplated, however, that the concepts of the present disclosure may be applied to other types of variable valve actuators, such as, for example, "lost motion" systems, where the valve actuation timing is shortened, or decreased, from the shape of the cam.

As shown in FIG. 2, each valve actuation assembly 44 includes a valve actuator 70. Valve actuator 70 includes an actuator cylinder 72 that defines an actuator chamber 76. An actuator piston 74 is slidably disposed within actuator cylinder 72 and is connected to an actuator rod 78. A return spring (not shown) may act on actuator piston 74 to return actuator piston 74 to a home position. Actuator rod 78 is engageable with an end 68 of rocker arm 64.

A fluid line 80 is connected to actuator chamber 76. Pressurized fluid may be directed through fluid line 80 into actuator chamber 76 to move actuator piston 74 within actuator cylinder 72. Movement of actuator piston 74 causes actuator rod 78 to engage end 68 of rocker arm 64.

Fluid may be introduced to actuator chamber 76 when intake valves 32 are in the open position to move actuator rod 78 into engagement with rocker arm 64 to thereby hold intake valves 32 in the open position. Alternatively, fluid may be introduced to actuator chamber 76 when intake valves 32 are in the closed position to move actuator rod 78 into engagement with rocker arm 64 and pivot rocker arm 64 about pivot 66 to thereby open intake valves 32.

As illustrated in FIGS. 1 and 3, a source of fluid 84 may be provided to draw fluid from a tank 87 that holds a supply of fluid, which may be, for example, a hydraulic fluid, a lubricating oil, a transmission fluid, or fuel. Source of fluid 84 may increase the pressure of the fluid and direct the fluid into a main gallery 83. Source of fluid 84 and main gallery 83 may be part of a lubrication system, such as typically accompanies an internal combustion engine. Main gallery 83 may contain pressurized fluid having a pressure of, for example, less than 700 KPa (100 psi) or, more particularly, between about 210 KPa and 620 KPa (30 psi and 90 psi). Alternatively, the source of hydraulic fluid may be a pump configured to provide fluid at a higher pressure, such as, for example, between about 10 MPa and 35 MPa (1450 psi and 5000 psi).

As shown in FIG. 3, a fluid supply system 79 connects main gallery 83 with valve actuator 70. A restrictive orifice 75 may be positioned in a fluid line 85 between main gallery 83 and a first end of fluid rail 86. A control valve 82 may be connected to an opposite end of fluid rail 86 and lead to tank 87. Control valve 82 may be opened to allow a flow of fluid through restrictive orifice 75 and a fluid rail 86 to tank 87. Control valve 82 may be closed to allow a build up of pressure in the fluid within fluid rail 86.

Fluid rail 86 may supply pressurized fluid to a series of valve actuators 70. Each valve actuator 70 may be associated with either the intake valves 32 or the exhaust valves 34 of a particular engine cylinder 22 (referring to FIG. 1). Fluid lines 80 direct pressurized fluid from fluid rail 86 into the actuator chamber 76 of each valve actuator 70.

A directional control valve 88 may be disposed in each fluid line 80. Each directional control valve 88 may be opened to allow pressurized fluid to flow between fluid rail 86 and actuator chamber 76. Each directional control valve 88 may be closed to prevent pressurized fluid from flowing between fluid rail 86 and actuator chamber 76. Directional control valve 88 may be normally biased into a closed position and actuated to allow fluid to flow through directional control valve 88. Alternatively, directional control valve 88 may be normally biased into an open position and actuated to prevent fluid from flowing through directional control valve 88. One skilled in the art will recognize that directional control valve 88 may be any type of controllable valve, such as, for example a two coil latching valve.

One skilled in the art will also recognize that fluid supply system 79 may have a variety of different configurations and include a variety of different components. For example, fluid supply system 79 may include one or more check valves (not shown). A first check valve may be placed in parallel with directional control valve 88 between restrictive orifice 75 and valve actuator 70. A second check valve may be placed in fluid line 85 between main gallery 83 and fluid rail 86. In addition, fluid supply system 79 may include a source of high pressure fluid. Fluid supply system 79 may also include a snubbing valve that controls the rate of fluid flow from valve actuator 70 and a damping system, which may include an accumulator and a restricted orifice, that prevents pressure oscillations in actuator chamber 76 and fluid line 80.

As shown in FIG. 1, a controller 100 may be connected to each valve actuation assembly 44 and to control valve 82. Controller 100 may include an electronic control module that has a microprocessor and a memory 01. As is known to those skilled in the art, the memory is connected to the microprocessor and stores an instruction set and variables. Associated with the microprocessor and part of electronic control module are various other known circuits such as, for example, power supply circuitry, signal conditioning circuitry, and solenoid driver circuitry, among others.

Controller 100 may be programmed to control one or more aspects of the operation of engine 20. For example, controller 100 may be programmed to control valve actuation assembly 44, the fuel injection system, and any other engine function commonly controlled by an electronic control module. Controller 100 may control engine 20 based on the current operating conditions of the engine and/or instructions received from an operator.

Controller 100 may control valve actuation assembly 44 by transmitting a signal, such as, for example, a current, to directional control valve 88. The transmitted signal may result in the selective opening and/or closing of directional control valve 88. If directional control valve 88 is a normally closed valve, the transmitted signal may cause directional control valve 88 to open for a certain period of time. If directional control valve 88 is a normally open valve, the transmitted signal may cause directional control valve to close for a certain period of time. By controlling the opening and closing of directional control valve 88, controller may control the flow of fluid to and from valve actuator 70 and thereby control the engagement of actuator rod 78 with rocker arm 64 to delay the closing of intake valve 32 for a predetermined period.

Engine 20 may include a series of sensors. Each sensor is configured to monitor a particular operating parameter of engine 20. For example, engine 20 may include a fluid sensor 90 (referring to FIG. 3), an intake air pressure sensor, an ambient air pressure sensor, an engine load sensor, an engine speed sensor, a fuel governor position sensor, an in-cylinder pressure sensor, a crankshaft angle sensor, or a sensor adapted to sense any other engine operating parameter.

In addition, as shown in FIG. 3, a viscosity sensor 81 may be adapted to sense the viscosity of fluid flowing between fluid rail 86 and actuator chamber 76. As shown, viscosity sensor 81 is disposed in fluid line 80. It is contemplated, however, that viscosity sensor 81 may be disposed in another location that allows viscosity sensor 81 to sense a parameter indicative of the viscosity of the fluid flowing to and from actuator chamber 76, such as, for example, directly within actuator chamber 76. It is further contemplated that viscosity sensor 81 may be any type of sensor readily apparent to one skilled in the art as capable of providing an indication as to the viscosity of a fluid.

The information sensed by viscosity sensor 81 is sent to controller 100. As described in greater detail below, controller 100 may use the sensed viscosity information to control the operation of valve actuator 70. In addition, controller 100 may monitor the sensed viscosity information to determine a rate of change in the viscosity as a function of time. The rate of change in viscosity may also be used to control the operation of valve actuator 70.

Memory 101 of controller 100 may store information related to the operation of engine 20 in the form of one or more "maps." For the purposes of the present disclosure, the term "map" is intended to include any electronic storage structure for storing information related to the operation of the engine, such as, for example, data tables, look-up tables, graphs, or any other electronic storage format readily apparent to one skilled in the art. These maps may define optimal engine operating characteristics as a function of engine operating parameters. For example, memory 101 may store a map that defines an optimal air-to-fuel ratio for a particular engine speed and fuel injection quantity. Similarly, memory 101 may store a map that defines an optimal fuel delivery rate for a particular engine speed and load. Memory 101 may store other maps, such as, for example, a map that defines limits on the valve actuation period for a particular engine speed and engine load.

Memory 101 may also store one or more maps that identify a response time of a valve actuator 70 for a given set of engine operating parameters. For the purposes of the present disclosure, the response time of valve actuator 70 may be measured as the time required for the engine valve 32 to close in response to a control signal to open directional control valve 88 to allow fluid to flow from actuator chamber 76. If directional control valve 88 is a normally open valve, the control signal may be the removal of a current applied to directional control valve 88. If directional control valve 88 is a normally closed valve, the control signal may be the application of a current to directional control valve 88.

It is contemplated that the response time of valve actuator 76 may vary during standard operation of engine 20. For example, a change in a fluid property, such as, for example, the fluid viscosity of the fluid used to operate valve actuator 76 may result in a change in the response time of the valve actuator. An increase in the fluid viscosity may increase the response time of valve actuator 76 whereas a decrease in the fluid viscosity may decrease the response time of valve actuator 70.

The fluid properties of the operating fluid may change with the operating conditions of engine 20. For example, any changes in the temperature of the operating fluid may change the viscosity of the operating fluid. The operating fluid may experience a temperature change during a warm-up period of engine 20. The temperature of engine 20, and the operating fluid, will increase as engine 20 operates after a cold start. As the temperature of the operating fluid increases, the viscosity of the operating fluid will decrease. Thus, the response time of valve actuator 70 will decrease as the temperature of engine 20 increases.

In addition, the type of fluid used as the operating fluid may result in viscosity changes during the standard operation of engine 20. For example, as described above, the engine lubricating oil may be the operating fluid. Because a typical lubricating oil behaves as non-Newtonian fluid, the viscosity of the lubricating oil changes as a function of shear rate (i.e. flow speed) as well as temperature. A typical lubricating oil is shear-thinning, which means that the viscosity will decrease when the shear rate increases and that the viscosity will increase when the shear rate decreases. Thus, at a given temperature, the viscosity of the lubricating oil may decrease as the operation of engine 20 increases the shear rate of the lubricating oil by circulating the lubricating oil through the lubrication system. This decrease in viscosity may result in a decrease in the response time of valve actuator 70.

The viscosity of the operating fluid may be further impacted by changes in the operating fluid. For example, the standard operation of the engine may result in the accumulation of fuel, water, dirt, and debris in the lubricating oil. This accumulation may change the viscosity of the lubricating oil, which may further impact the response time of valve actuator 70.

In addition, the viscosity of the operating fluid may change as the lubricating oil ages or when engine 20 is serviced. For example, the viscosity of the operating fluid may decrease"if the lubricating oil is changed from a more viscous SAE 15W40 oil with a less viscous SAE 5W20 oil. This decrease in viscosity may result in a decrease in the response time of valve actuator 70.

To account for the changes in the response time of valve actuator 70, memory 101 may store maps that define a relationship between various engine operating parameters and the response time of valve actuator. For example, memory 101 may store a map that defines the relationship between the viscosity of the operating fluid and the response time of valve actuator. This map may further take into consideration other operating parameters that may have an impact on the response time, such as, for example, a rate of change in the viscosity of the operating fluid, the temperature of the operating fluid, and the pressure of the fluid in fluid rail 86.

Each of the maps stored in memory 101 may be developed by testing the operation of engine 20 and/or valve actuator 70 in a controlled testing environment. For example, a response time map may be generated by measuring the response time for a particular valve actuator 70 under a number of different operating parameters. One or more operating parameters, such as the fluid viscosity, the rate of change in fluid viscosity, the fluid rail pressure, and the fluid temperature may be varied while the response time of valve actuator 70 is measured. The data collected during this testing process may be used to generate a map that defines the relationship between the response time and the particular operating parameters.

Controller 100 may access the response time maps to determine the response time for valve actuator 70. Controller 100 may use information from the sensors, such as viscosity sensor 81, to access the maps to determine a response time for the valve actuator 70. Controller 100 may use the response time to determine when to send the control signal to open directional control valve 88 to achieve a desired valve closing time.

INDUSTRIAL APPLICABILITY

Controller 100 may selectively operate valve actuator 70 to implement a late intake type Miller cycle, or other variation on a conventional valve actuation, in engine 20. When implementing a late intake Miller cycle, controller 100 operates valve actuator 70 to delay the closing of intake valve 32 from a conventional closing, where the closing substantially coincides with the end of an intake stroke, to a delayed closing, where intake valve 32 is held open for a predetermined portion of a compression stroke. The duration of the intake valve actuation period may be determined based on the current operating conditions of engine 20.

As described above, cam assembly 52 controls the initial actuation timing of intake valves 32. As cam 60 and push rod 61 start to pivot rocker arm 64, controller 100 ensures control valve 82 is in a closed position and directional control valve 88 is in an open position. This results in pressurized fluid flowing from source of hydraulic fluid 84 through fluid rail 86 and into actuator chamber 76. The force of the fluid entering actuator chamber 76 moves actuator piston 74 so that actuator rod 78 follows end 68 of rocker arm 64 as rocker arm 64 pivots to open intake valves 32. The distance and rate of movement of actuator rod 78 will depend upon the configuration of actuator chamber 76 and fluid supply system 79. Fluid supply system 79 may be configured to provide a sufficient flow of fluid to actuator chamber 76 to ensure that actuator chamber 76 is filled with fluid before cam 60 returns intake valve 32 to the closed position.

Controller 100 may actuate valve actuator 70 by closing directional control valve 88. This prevents fluid from escaping from actuator chamber 76. As cam 60 continues to rotate and springs 56 urge intake valves 32 towards the closed position, actuator rod 78 will engage end 68 of rocker arm and prevent intake valves 32 from closing. As long as directional control valve 88 remains in the closed position, the trapped fluid in actuator chamber 76 will prevent springs 56 from returning intake valves 32 to the closed position. Thus, valve actuator 70 will hold intake valves 32 in the open position, independently of the action of cam assembly 52.

Controller 100 may disengage valve actuator 70 to close intake valves 32 by opening directional control valve 88. This allows the pressurized fluid to flow out of actuator chamber 76. The force of springs 56 forces the fluid from actuator chamber 76, thereby allowing actuator piston 74 to move within actuator cylinder 72. This allows rocker arm 64 to pivot so that intake valves 32 are moved to the closed position.

The response time of valve actuator 70, or the time required for intake valves 32 to close from the opening of directional control valve 88, depends on the rate at which the fluid flows out of actuator chamber 76. The fluid flow rate depends on the properties of the fluid in the actuator chamber 76 and on the pressure of the fluid in fluid rail 86. For example, the viscosity of the fluid in actuator chamber 76 will impact the fluid flow rate out of actuator chamber 76. A higher fluid viscosity may cause a lower flow rate and a longer response time. A lower fluid viscosity may cause a higher flow rate and a shorter response time.

Figure 4:
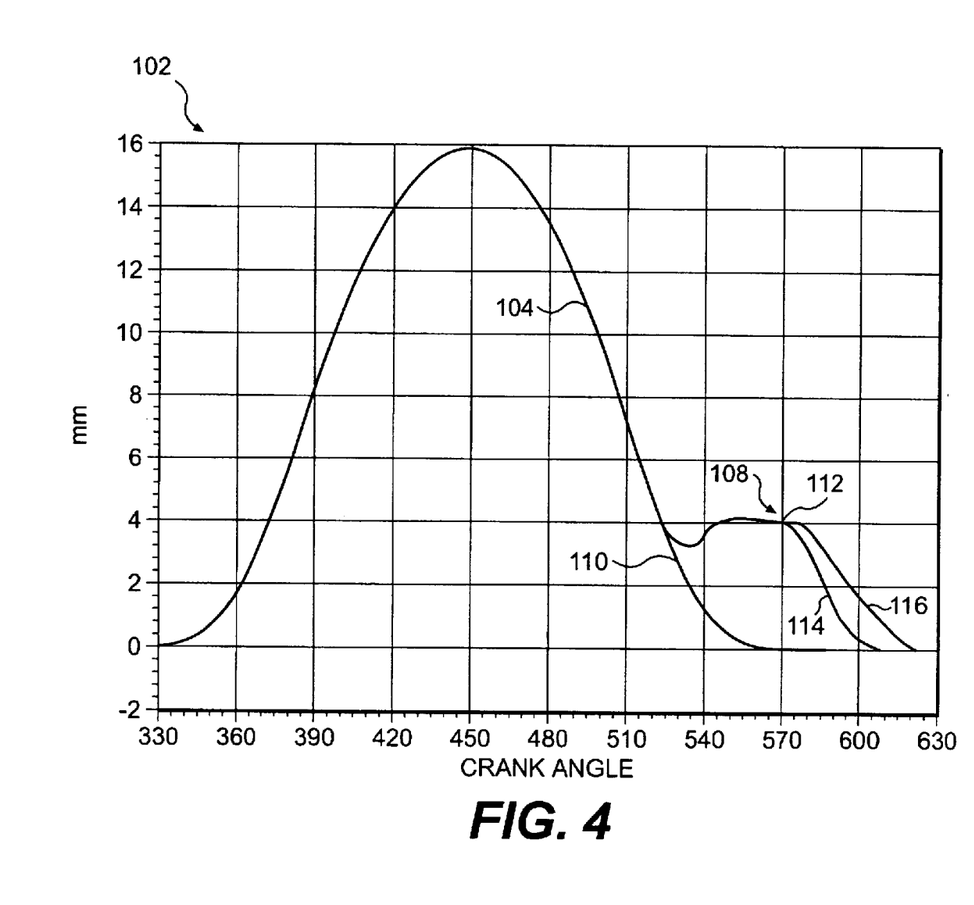
FIG. 4 is a graphic illustration of an exemplary intake valve actuation.

As illustrated in FIG. 4, operation of valve actuator 70 may extend an intake valve actuation 104 from a conventional closing 110 to a delayed closing 108. The period, or duration, of the extended intake valve actuation may be measured in terms of the angle of rotation of crankshaft 27, as a function of time, or in any other manner readily apparent to one skilled in the art. When implementing a late intake type Miller cycle, the extended intake valve actuation period may be between about 0° and 120° crankshaft rotation. One skilled in the art will recognize, however, that valve actuator 70 may be used to implement other types of valve actuation timing variations.

The rate at which fluid flows from actuator chamber 76 will impact the closing time of intake valves 32. At the open control signal point 112, fluid will start to exit actuator chamber 76 to allow intake valve 32 to move towards a closed position. If the fluid in actuator chamber 76 has a low viscosity, which results in a higher flow rate, intake valves 32 may close according to low viscosity closing line 114. If the fluid in actuator chamber 76 has a high viscosity, which results in a lower flow rate, intake valve 32 may close according to high viscosity closing line 116. Thus, an increase in the viscosity of the fluid in actuator chamber 76 may delay the response time of valve actuator 70.

Controller 100 may vary the intake valve actuation period to achieve optimum engine performance based upon the current operating conditions of engine 20. Controller 100 may receive information about the current operating conditions of engine 20 from the various sensors. For example, controller 100 may receive an indication of the current engine speed, the current engine load, and the ambient air pressure. Controller 100 may also receive information regarding additional operating parameters of engine 20, such as, for example, an intake manifold pressure, an in-cylinder pressure, or an operating fluid temperature.

Controller 100 may then determine a fuel injection quantity. Controller 100 may use the current engine load and speed to access a lookup map that stores the fuel injection quantity as a function of engine load and speed. The fuel injection quantity may represent the total quantity of fuel that is injected into cylinder 22 during a particular operating cycle, including any "pilot injection."

Controller 100 may determine the intake valve actuation period. The intake valve actuation period may be expressed as a function of the engine speed (ES), the intake air pressure (IP), and the desired airflow (AF). For example, the intake valve actuation period (P) may be determined by the following equation:

$$P = A + B(ES) + C(ES)^2 + D(IP) + E(IP)^2 + F(AF) + G(AF)2 + H(ES)(IP)(AF)$$

Where A, B, C, D, E, F, G, and H are constants. For example, the values of these constants may be as follows: A=342.03; B=−0.213; C=6.27E5; D=−1.215; E=0.00141; F=12.14; G=−0.0558; and H=−5.27E−1.

The above formula will yield an intake valve actuation period, P, that is expressed in terms of an engine crank angle. The determined crank angle may represent the angle at which intake valves 32 should be returned to the closed position. One skilled in the art may recognize that different formulas and/or constants may be developed to present different representations of the valve actuation period. For example, valve actuation period may be expressed as an amount of a rotation of crankshaft or a time period.

Controller 100 may then determine the engine crank angle at which to open directional control valve 88. The crank angle at which directional control valve 88 should be opened depends on the response time of valve actuator 70 for the particular operating conditions of engine 20. Controller 100 may access the response time maps stored in memory 101 with one or more sensed operating parameters to determine the response time for valve actuator 70.

For example, controller 100 may access the response time maps with the sensed viscosity of the fluid in valve actuator 70. Alternatively, controller 100 may access the response time maps with the estimated viscosity, based on the rate of change in the viscosity of the fluid in valve actuator 70. In addition, controller 100 may access the response time maps with the fluid temperature and/or fluid pressure. It is contemplated that controller 100 may access the response time maps to determine the expected response time of valve actuator 70 with any relevant engine operating parameters.

Controller 100 may use the response time from the response time maps to determine the appropriate engine crank angle at which to open directional control valve 88. If necessary, controller 100 may convert the response time to engine crank angle using the rotational speed of the engine. In this manner, controller 100 may control the closing of intake valve 32 to coincide with the end of the desired intake valve actuation period and thereby maximize the performance gains associated with implementing the "late-intake" Miller cycle.

The above-described method provides for the control of a variable valve actuation assembly for an internal combustion engine to account for variations in the response time of a valve actuator due to changes in the properties of the operating fluid. By accounting for changes in the response time of the valve actuator, the actuation timing of the engine valve may be precisely controlled. In the manner the potential performance gains afforded by the variable valve actuation assembly may be maximized.

It will be apparent to those skilled in the art that various modifications and variations can be made in the described system and method without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. A method of controlling a variable valve actuation system for an engine, comprising:
   moving an engine valve between a first position where the engine valve blocks a flow of fluid and a second position where the engine valve allows a flow of fluid;
   providing fluid to a chamber of a valve actuator adapted to operatively engage the engine valve;
   sensing a parameter indicative of a viscosity of the fluid provided to the chamber of the valve actuator;
   trapping fluid within the chamber of the valve actuator to prevent the engine valve from moving to the first position;
   determining a response time of the valve actuator as a function of the sensed parameter indicative of viscosity, the response time indicating the time required to release the fluid from the chamber of the valve actuator to allow the engine valve to move to the first position;
   determining a desired valve actuation period; and
   releasing the fluid trapped in the chamber of the valve actuator to thereby release the engine valve at a time based on the response time of the valve actuator such that the engine valve moves to the first position at the end of the desired valve actuation period.

2. The method of claim 1, wherein the response time of the valve actuator is determined by accessing a map defining a relationship between the fluid viscosity and the response time of the valve actuator.

3. The method of claim 1, further including determining a rate of change in the viscosity of the fluid provided to the actuator chamber.

4. The method of claim 3, further including estimating the viscosity of the fluid provided to the actuator chamber at a future time based on the rate of change in the viscosity.

5. The method of claim 3, wherein the rate of change in the viscosity is determined by sensing the viscosity of the fluid provided to the actuator chamber as a function of time.

6. The method of claim 3, wherein the response time of the valve actuator is determined by accessing a map defining a relationship between the fluid viscosity, the rate of change in the viscosity, and the response time of the valve actuator.

7. The method of claim 1, further including:
   sensing an engine speed, sensing an engine load;
   sensing an intake air pressure; and
   determining the desired engine valve actuation period based on the sensed engine speed, engine load, and intake air pressure.

8. A variable valve actuation system for an engine, comprising:
   an engine valve moveable between a first position where the engine valve prevents a flow of fluid and a second position where the engine valve allows a flow of fluid;
   a cam assembly connected to the engine valve to move the engine valve between the first position and the second position;
   a valve actuator having a chamber adapted to receive a flow of fluid, the valve actuator operable to prevent the engine valve from returning to the first position;
   a sensor operable to sense a parameter indicative of a viscosity of the flow of fluid entering the chamber of the valve actuator;
   a controller adapted to determine a response time of the valve actuator as a function of the sensed parameter indicative of viscosity, the response time indicative of the amount of time required to release the fluid from the chamber of the valve actuator to allow the engine valve to move to the first position; and
   the controller configured to determine a desired valve actuation period.

9. The system of claim 8, further including a control valve operable to control the flow of fluid to and from the chamber of the valve actuator.

10. The system of claim 9, wherein the controller is operable to open the control valve to release the fluid trapped in the chamber of the valve actuator and thereby release the engine valve at a time based on the response time of the valve actuator, wherein the engine valve moves to the first position at the end of the desired valve actuation period.

11. The system of claim 8, wherein the controller has a memory adapted to store a map defining a relationship between the fluid viscosity and the response time of the valve actuator.

12. The system of claim 8, wherein the controller determines a rate of change in the viscosity of the fluid provided to the actuator chamber.

13. The system of claim 12, wherein the controller estimates the viscosity of the fluid provided to the actuator chamber at a future time based on the rate of change in the viscosity.

14. The system of claim 13, wherein the controller has a memory adapted to store a map defining a relationship between the fluid viscosity, the rate of change in the viscosity, and the response time of the valve actuator.

15. An engine, comprising:

an engine block defining at least one cylinder;

a piston slidably disposed within the at least one cylinder;

an engine valve moveable between a first position where the engine valve prevents a flow of fluid to the at least one cylinder and a second position where the engine valve allows a flow of fluid to the at least one cylinder;

a cam assembly connected to the engine valve to move the engine valve between the first position and the second position;

a valve actuator having a chamber adapted to receive a flow of fluid, the valve actuator operable to prevent the engine valve from returning to the first position;

a sensor operable to sense a parameter indicative of a viscosity of the flow of fluid entering the chamber of the valve actuator;

a controller adapted to determine a response time of the valve actuator as a function of the sensed parameter indicative of viscosity, the response time indicative of the amount of time required to release the fluid from the chamber of the valve actuator to allow the engine valve to move to the first position; and the controller configured to determine a desired valve actuation period.

16. The engine of claim 15, further including a control valve operable to control the flow of fluid to and from the chamber of the valve actuator.

17. The engine of claim 16, wherein the controller is operable to open the control valve to release the fluid trapped in the chamber of the valve actuator and thereby release the engine valve at a time based on the response time of the valve actuator, wherein the engine valve moves to the first position at the end of the desired valve actuation period.

18. The engine of claim 15, wherein the controller has a memory adapted to store a map defining a relationship between the fluid viscosity and the response time of the valve actuator.

19. The engine of claim 15, wherein the controller determines a rate of change in the viscosity of the fluid provided to the actuator chamber.

20. The engine of claim 19, wherein the controller estimates the viscosity of the fluid provided to the actuator chamber at a future time based on the rate of change in the viscosity.

21. The engine of claim 20, wherein the controller has a memory adapted to store a map defining a relationship between the fluid viscosity, the rate of change in the viscosity, and the response time of the valve actuator.

22. A variable valve actuation system for an engine, comprising:

an engine valve moveable between a first position where the engine valve prevents a flow of fluid and a second position where the engine valve allows a flow of fluid;

a valve actuator having a chamber;

a control valve in fluid communication with the chamber of the valve actuator, the control valve moveable between a first position where fluid may flow relative to the chamber of the valve actuator and a second position where fluid is prevented from flowing relative to the chamber of the valve actuator, the control valve moveable to the second position to trap fluid in the chamber of the valve actuator to thereby prevent the engine valve from returning to the first position;

a sensor operable to sense a parameter indicative of a viscosity of a flow of fluid entering the chamber of the valve actuator and to deliver a signal having a representation of the parameter;

a controller adapted to receive the signal from the sensor and to determine a response time of the valve actuator as a function of the sensed parameter indicative of viscosity, the response time indicative of the amount of time required for the engine valve to move to the first position from the time that the control valve is moved from the second position to the first position; and the controller configured to detemine a desired valve actuation period.

23. The system of claim 22, wherein the controller is operable to move the control valve to the first position to thereby release the fluid trapped in the chamber of the valve actuator such that the engine valve moves to the first position at the end of the desired valve actuation period.

24. The system of claim 22, wherein the controller has a memory adapted to store a map defining a relationship between the fluid viscosity and the response time of the valve actuator.

25. The system of claim 22, wherein the controller determines a rate of change in the viscosity of the fluid provided to the actuator chamber.

26. The system of claim 25, wherein the controller estimates the viscosity of the fluid provided to the actuator chamber at a future time based on the rate of change in the viscosity.

27. The system of claim 22, wherein the controller has a memory adapted to store a map defining a relationship between the fluid viscosity, the rate of change in the viscosity, and the response time of the valve actuator.

* * * * *

UNITED STATES PATENT AND TRADEMARK OFFICE
CERTIFICATE OF CORRECTION

PATENT NO. : 7,178,491 B2
APPLICATION NO. : 10/454616
DATED : February 20, 2007
INVENTOR(S) : David Y. Chang It is certified that error appears in the above-identified patent and that said Letters Patent is hereby corrected as shown below:

On the Title Page:

1. On the Title Page, in field (56), under "FOREIGN PATENT DOCUMENTS", Column 1, Line 2, delete "200120457" and insert --"2000120457--.

2. On the Title Page, in field (56), under "FOREIGN PATENT DOCUMENTS", Column 1, Line 3, delete "200145484" and insert --2000145484--.

In the Specification:

3. In Column 6, Line 38, delete "01" and insert --101--.

4. In Column 10, Line 54, in equation, delete "G(AF)2" and insert --$G(AF)^2$--

5. In Column 10, Line 57, delete "C=6.27E5" and insert --C=6.27E-5--

In the Claims:

6. In Column 14, Line 31, in Claim 22, delete "detemine" and insert --determine--.

Signed and Sealed this

Tenth Day of June, 2008

JON W. DUDAS
*Director of the United States Patent and Trademark Office*